United States Patent
Jung

(10) Patent No.: US 7,450,970 B2
(45) Date of Patent: Nov. 11, 2008

(54) APPARATUS AND METHOD FOR MANAGING USER DATA IN A MOBILE TERMINAL

(75) Inventor: Won-Suk Jung, Ansan-si (KR)

(73) Assignee: Samsung Electronics Co., Ltd (KR)

( * ) Notice: Subject to any disclaimer, the term of this patent is extended or adjusted under 35 U.S.C. 154(b) by 567 days.

(21) Appl. No.: 11/293,552

(22) Filed: Dec. 2, 2005

(65) Prior Publication Data

US 2006/0128359 A1 Jun. 15, 2006

(30) Foreign Application Priority Data

Dec. 14, 2004 (KR) .................. 10-2004-0105861

(51) Int. Cl.
*H04B 1/38* (2006.01)

(52) U.S. Cl. ............... 455/566; 455/414.1; 455/550.1; 455/556.2; 455/564; 349/22; 349/23; 349/25; 349/27; 349/169; 379/142.06; 379/355.06; 379/93.18; 379/93.23; 379/93.27

(58) Field of Classification Search ............. 455/412.1, 455/412.2, 414.1, 550.1, 556.2, 564, 566; 345/22, 23, 24, 25, 26, 27, 169, 549, 589, 345/597, 600, 601, 602, 605; 379/93.18, 379/93.23, 93.27, 142.06, 355.06
See application file for complete search history.

(56) References Cited

U.S. PATENT DOCUMENTS

| 5,933,780 | A | * | 8/1999 | Connor et al. ............. 455/519 |
| 5,946,636 | A | * | 8/1999 | Uyeno et al. .............. 455/566 |
| 6,968,046 | B2 | * | 11/2005 | Mizuno ................ 379/93.23 |
| 7,151,953 | B2 | * | 12/2006 | Hamada et al. ............ 455/567 |
| 7,260,419 | B2 | * | 8/2007 | Lee ........................ 455/566 |
| 7,272,384 | B2 | * | 9/2007 | Tsukamoto ............. 455/412.1 |
| 2005/0079894 | A1 | * | 4/2005 | Shin et al. ................ 455/564 |

* cited by examiner

*Primary Examiner*—Charles N Appiah
*Assistant Examiner*—Olumide T Ajibade Akonai
(74) *Attorney, Agent, or Firm*—The Farrell Law Firm, PC

(57) ABSTRACT

A method of managing a user database in a mobile terminal includes, when communication using an arbitrary telephone number registered in a phone book occurs, updating a communication time of the telephone number to the time when the communication is terminated; searching for the communication time by a display request of phone book information including the telephone number; calculating a time interval from a present time to the communication time and searching for a connection period to which the calculated time interval belongs among a plurality of connection periods having different predetermined time intervals; and displaying a communication time mark corresponding to the searched connection period among a plurality of communication time marks corresponding to the plurality of connection periods with the requested phone book information.

9 Claims, 4 Drawing Sheets

APPARATUS AND METHOD FOR MANAGING USER DATA IN A MOBILE TERMINAL

PRIORITY

This application claims priority under 35 U.S.C. § 119 to an application entitled "Apparatus and Method for Managing User Data in Mobile Terminal" filed in the Korean Intellectual Property Office on Dec. 14, 2004 and assigned Serial No. 2004-105861, the contents of which are incorporated herein by reference.

BACKGROUND OF THE INVENTION

1. Field of the Invention

The present invention relates generally to a mobile terminal, and in particular, to a method of managing a user database stored in a mobile terminal.

2. Description of the Related Art

Mobile terminals as a communication means have become a requisite for modern life. Users of mobile terminals now communicate with various people for various reasons using the mobile terminals. The users have now demanded additional functions for increasing convenience of use besides the basic function of a mobile terminal, which is call connection with another communication terminal. A phone book function and a call history function are examples of two of these additional functions.

In general, a large amount of telephone numbers can now be registered in a phone book, and a user can search for the registered telephone numbers if necessary. However, the number of telephone numbers with which the user frequently communicates is actually way less than the number of the registered telephone numbers. In particular, telephone numbers never used for communication for a long time can exist, and there is no way to confirm this. This means that a memory space of a mobile terminal is inefficiently wasted and that a user database is not smoothly managed.

If a communication service has been recently used, a user can determine when the call was performed with a telephone number related to the communication service through the call history function. The call history function temporarily stores call history information related to various communication services accessed through the mobile terminal and provides the stored call history information if the user demands. For a communication service requiring call connection, such as a circuit switching call, a video call, or a push-to-talk (PTT) call, the call history information typically includes a telephone number of a party with which a call was performed, a call termination time, and a total call time. For a message service, the call history information typically includes a telephone number of another party and a received/transmitted time.

The call history information, for instance, is provided by a mobile terminal displaying a call history list on a display unit through a menu such as a recent call list. If the telephone number of another party is a telephone number that has already been registered in a phone book, a user name registered in the phone book is also displayed on the display unit. Herein, the call history information is temporarily and finitely stored in the mobile terminal. For example, around 60 to 200 call histories may be stored based on a recent call termination time, and every time when a new call history is generated, the oldest call history information is automatically deleted.

Thus, the call history function allows a user to determine a call time for a person who the user has recently communicated with, but an old call record in the call history, which has already been deleted since the call time was too old, cannot be determined. Moreover, for a user who frequently makes phone calls, the period of time for viewing call records in the call history can be as short as a few days. In addition, to determine when a call was made with a specific person in the call history that has not been deleted yet, the user must review the entire call history list one by one. In addition, for people who have not been communicated with for a long time, even if they are registered in the phone book, the user cannot determine that there has been no call activity with those people for a long time.

As described above, a process of using and managing a user database, such as phone book information and call history information causes a user inconvenience.

SUMMARY OF THE INVENTION

An object of the present invention is to substantially solve at least the above problems and/or disadvantages and to provide at least the advantages below. Accordingly, an object of the present invention is to provide a method of efficiently managing a user database.

Another object of the present invention is to provide a user database management method by which call history information can be confirmed in a more visual way.

A further object of the present invention is to provide a user database management method by which call history information of all users registered in a phone book can be confirmed.

According to one aspect of the present invention, there is provided a method of managing a user database in a mobile terminal, the method including when communication using an arbitrary telephone number registered in a phone book occurs, updating the time when the communication is terminated to a communication time of the telephone number; searching for the communication time by a display request of phone book information including the telephone number; calculating a time interval from a present time to the communication time and searching for a connection period to which the calculated time interval belongs among a plurality of connection periods having different predetermined time intervals; and displaying a communication time mark corresponding to the searched connection period among a plurality of communication time marks corresponding to the plurality of connection periods with the requested phone book information.

According to another aspect of the present invention, there is provided an apparatus for managing a user database in a mobile terminal, the apparatus including a phone book; a memory module for storing communication time information corresponding to telephone numbers registered in the phone book, a plurality of connection periods having different time intervals, and a plurality of communication time marks corresponding to the plurality of connection periods by identifying kinds of communication services; and a controller module for, when communication using an arbitrary telephone number registered in a phone book occurs, updating the time when the communication is terminated to a communication time of the telephone number, searching for the communication time by a display request of phone book information including the telephone number, calculating a time interval from a present time to the communication time and searching for a connection period to which the calculated time interval belongs, and displaying a communication time mark corresponding to the searched connection period with the requested phone book information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
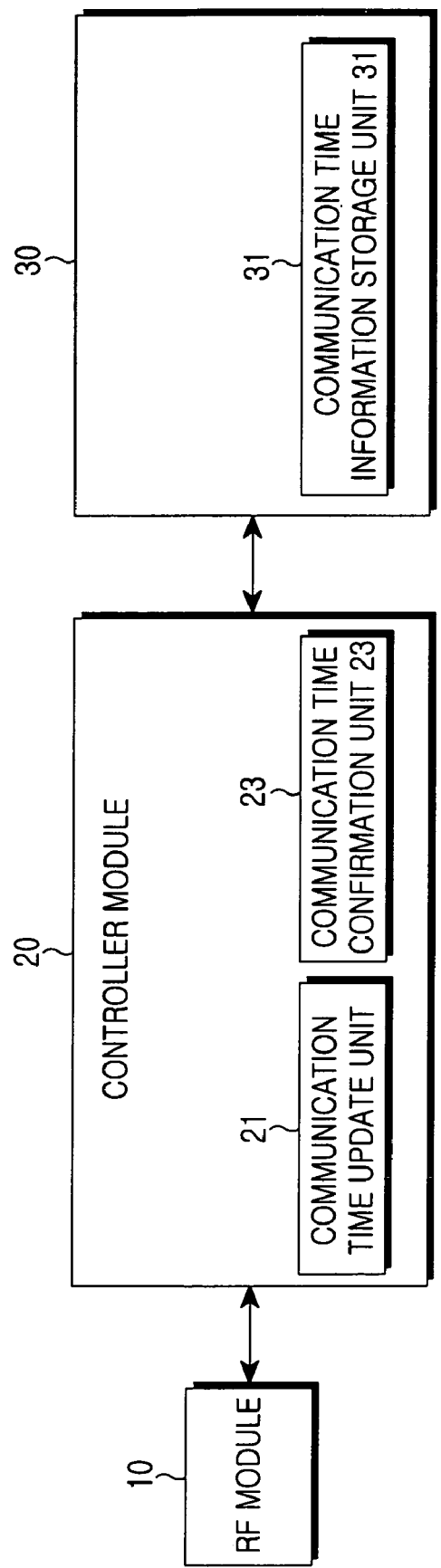
FIG. 1 is a block diagram of a mobile terminal according to a preferred embodiment of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

A configuration of a mobile terminal according to a preferred embodiment of the present invention will now be described with reference to FIG. 1, which is a block diagram of a mobile terminal according to a preferred embodiment of the present invention. Referring to FIG. 1, the mobile terminal includes a radio frequency (RF) module 10, a controller module 20, and a memory module 30.

The controller module 20 controls the RF module 10 to modulate/demodulate an RF signal including voice data or control data received through an antenna.

The memory module 30 includes a communication time information storage unit 31 according to a preferred embodiment of the present invention. The memory module 30 stores programs for an overall operation process and control of the controller module 20, reference data, various updatable data, and phone book data. By a user's demand, telephone numbers used for various communication services, such as a circuit switching call, a video call, a PTT call, a short message service, and a multimedia message service, can be registered in a phone book.

The communication time information storage unit 31 stores communication time information corresponding to the telephone numbers registered in the phone book by identifying types of the communication services performed by the mobile terminal according to a preferred embodiment of the present invention. The communication time information includes a call termination time or an outgoing time according to a type of communication service and is generally composed of the year, month, day, and time. For example, when the type of communication service performed by the mobile terminal is a communication service requiring call connection, such as a circuit switching call, a video call, or a PTT call, the communication time information includes a call termination time at which the call connection is finished. The communication time information is stored by identifying a type of circuit switching call time information of a certain telephone number, video call time information of a certain telephone number, or PTT call time information of a certain telephone number. If the type of communication service is an outgoing message such as a short message or a multimedia message, the communication time information includes an outgoing time of the message and is stored by identifying a type of short message communication time information of a certain telephone number or multimedia message communication time information of a certain telephone number.

The communication time information storage unit 31 stores a plurality of connection period data, which is data indicating predetermined time intervals, and each connection period has a different time interval. The plurality of connection periods can be implemented by predetermined fixed values or implemented so that the number of connection periods and a time interval of each connection period can be set by a user's demand. Hereinafter, a case where four of pre-set connection period data are stored will be described as an embodiment. The four connection periods are set to a week for a first connection period, a month for a second connection period, two months for a third connection period, and six months or more for a fourth connection period.

The communication time information storage unit 31 stores a plurality of communication time mark data corresponding to the plurality of connection periods. That is, the communication time mark data is graphic data of figures or characters having different features. For example, if the connection periods are the same as described above, and if the communication time mark data is represented by rectangular graphic data having different colors, the communication time mark data is configured so that the communication time mark data corresponding to the first connection period is green rectangular graphic data, the communication time mark data corresponding to the second connection period is black rectangular graphic data, the communication time mark data corresponding to the third connection period is yellow rectangular graphic data, and the communication time mark data corresponding to the fourth connection period is red rectangular graphic data. Hereinafter, the setting of the communication time mark data will be described as an embodiment.

The controller module 20 includes a communication time update unit 21 and a communication time confirmation unit 23. The controller module 20 performs an overall control for an operation of the mobile terminal. According to a preferred embodiment of the present invention, the controller module 20 controls the communication time update unit 21 to update communication time information stored in the communication time information storage unit 31 based on a service type and time of communication. The controller module 20 controls the communication time confirmation unit 23 to search for the stored communication time information.

A process of storing communication time information and displaying the stored communication time information by linking to the phone book in the mobile terminal having the configuration described above according to a preferred embodiment of the present invention is as follows. If a communication service, such as a circuit switching call, a video call, or a PTT call, is performed by in the mobile terminal, the controller module 20 determines whether a telephone number related to the communication service is registered in the phone book. If the telephone number related to the communication service is registered in the phone book, the controller module 20 updates communication time information corresponding to the telephone number to a call termination time of the present communication by identifying a type of communication service. If an outgoing short message or multimedia message is sensed, the controller module 20 determines whether an outgoing telephone number is registered in the phone book in the above process. If the outgoing telephone number is registered in the phone book, the controller module 20 updates communication time information corresponding to the outgoing telephone number to a present outgoing time.

Thereafter, if an arbitrary phone book information display request is input by a user, the controller module 20 obtains communication times by searching for communication time information corresponding to telephone numbers included in the arbitrary phone book information. The controller module 20 calculates time intervals between a present time and the obtained communication times and searches for a connection period to which each of the calculated time intervals belongs among the plurality of connection periods. The controller module 20 extracts communication time mark data representing the searched connection periods and displays corresponding marks with the requested phone book information.

Figure 2:
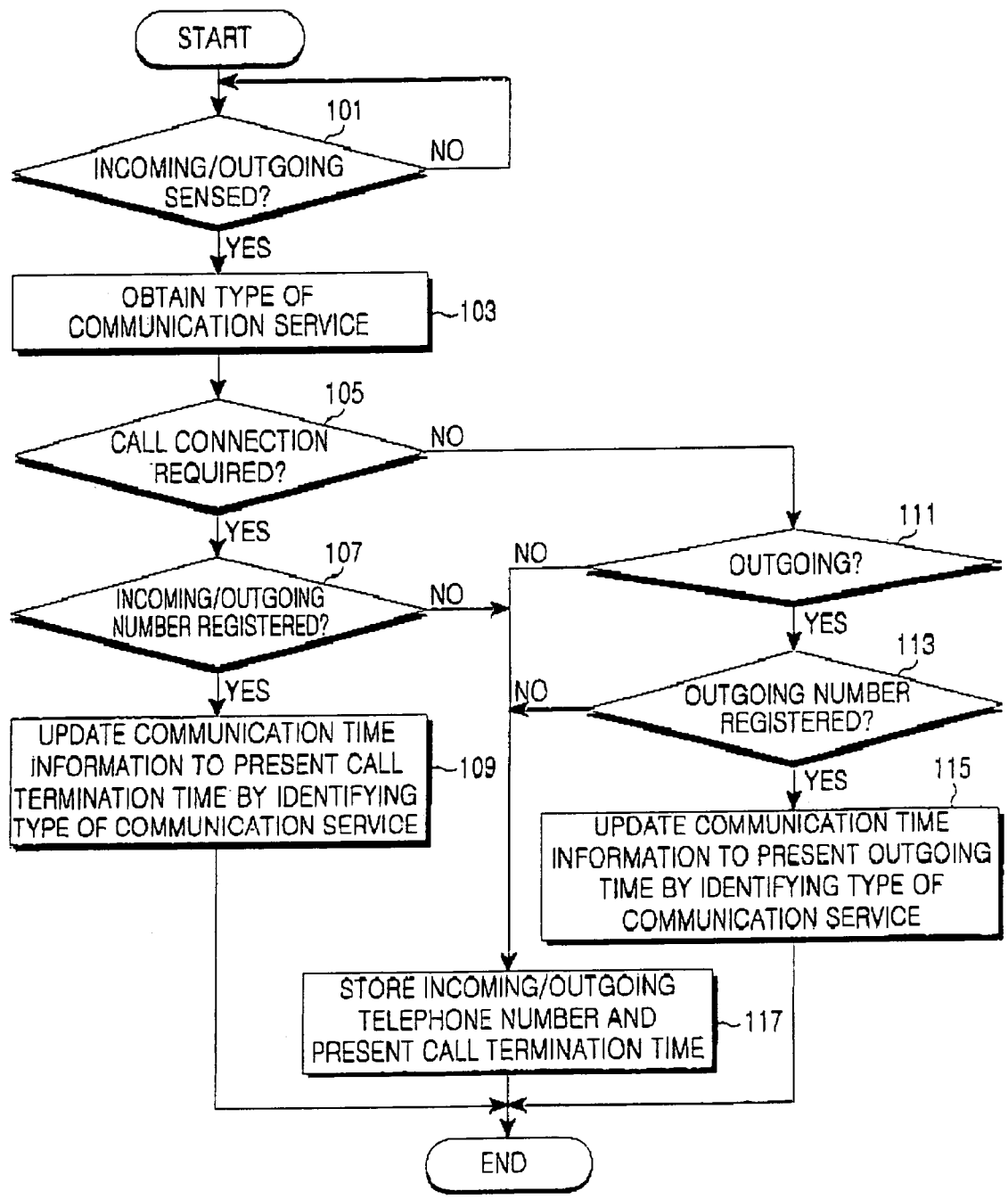
FIG. 2 is a flowchart illustrating a communication time storing process according to a preferred embodiment of the present invention.

An operation of the controller module 20 according to a preferred embodiment of the present invention will now be described with reference to FIGS. 2 and 3. First, a communication time storing process according to a preferred embodiment of the present invention will now be described in detail with reference to the flowchart of FIG. 2. Referring to FIG. 2, in step 101, the controller module 20 determines whether an incoming/outgoing signal exists in the mobile terminal. If the incoming/outgoing signal is sensed, the controller module 20 obtains a type of the incoming/outgoing communication service in step 103. In step 105, the controller module 20 determines whether the communication service requires call connection. As a result of the determination, if the communication service requires call connection, the process proceeds to step 107, and if the communication service does not require call connection, the process proceeds to step 111. For example, if the incoming/outgoing signal sensed in step 101 is an incoming/outgoing signal of one of various call services, such as a circuit switching call, a video call, and a PTT call, the process proceeds to step 107, and if the incoming/outgoing signal sensed in step 101 is an incoming/outgoing signal of one of various message services, such as a short message service and a multimedia message service, the process proceeds to step 111.

In step 107, the controller module 20 determines whether a telephone number used in the incoming/outgoing signal is registered in the phone book. As a result of the determination, if the telephone number is registered in the phone book, the process proceeds to step 109, and if the telephone number is not registered in the phone book, the process proceeds to step 117. In step 109, the controller module 20 updates communication time information of the telephone number to a present call termination time by identifying the type of communication service obtained in step 103 and finishes the process. In step 117, since the telephone number used in the incoming/outgoing signal is not registered in the phone book, the controller module 20 temporarily stores the telephone number used in the incoming/outgoing signal and the present call termination time as usual and finishes the process. For example, if the communication service obtained in step 103 is a circuit switching call, and if the communication service is performed using a telephone number registered in the phone book, the controller module 20 updates circuit switching call time information of the telephone number to the present call termination time and stores the updated communication time information in the communication time information storage unit 31.

In step 111, the controller module 20 determines whether the communication service is an incoming or outgoing communication service. As a result of the determination, the process proceeds to step 117 in a case of an incoming service, and the process proceeds to step 113 in a case of an outgoing service. That is, since an outgoing time is stored as the communication time information in a case of a short message service or a multimedia message service according to a preferred embodiment of the present invention, if an incoming message is sensed in step 111, the process proceeds to step 117. If an outgoing message is sensed in step 111, the controller module 20 performs a series of control procedures to update the communication time information to a present outgoing time. In step 113, the controller module 20 determines whether an outgoing telephone number is registered in the phone book. As a result of the determination, if the outgoing telephone number is registered in the phone book, the process proceeds to step 115, and if the outgoing telephone number is not registered in the phone book, the process proceeds to step 117. In step 115, the controller module 20 updates communication time information of the telephone number to the present outgoing time by identifying the type of communication service obtained in step 103 and finishes the process. As an example, if the type of communication service is a short message service, in step 115, the controller module 20 updates short message communication time information of the telephone number to the present outgoing time and finishes the process. As another example, if the type of communication service is a multimedia message service, in step 115, the controller module 20 updates multimedia message communication time information of the telephone number to the present outgoing time and finishes the process.

A process of efficiently providing phone book information to a user using the communication time information stored in the process described above will now be described in detail with reference to the flowchart of FIG. 3.

Figure 3:
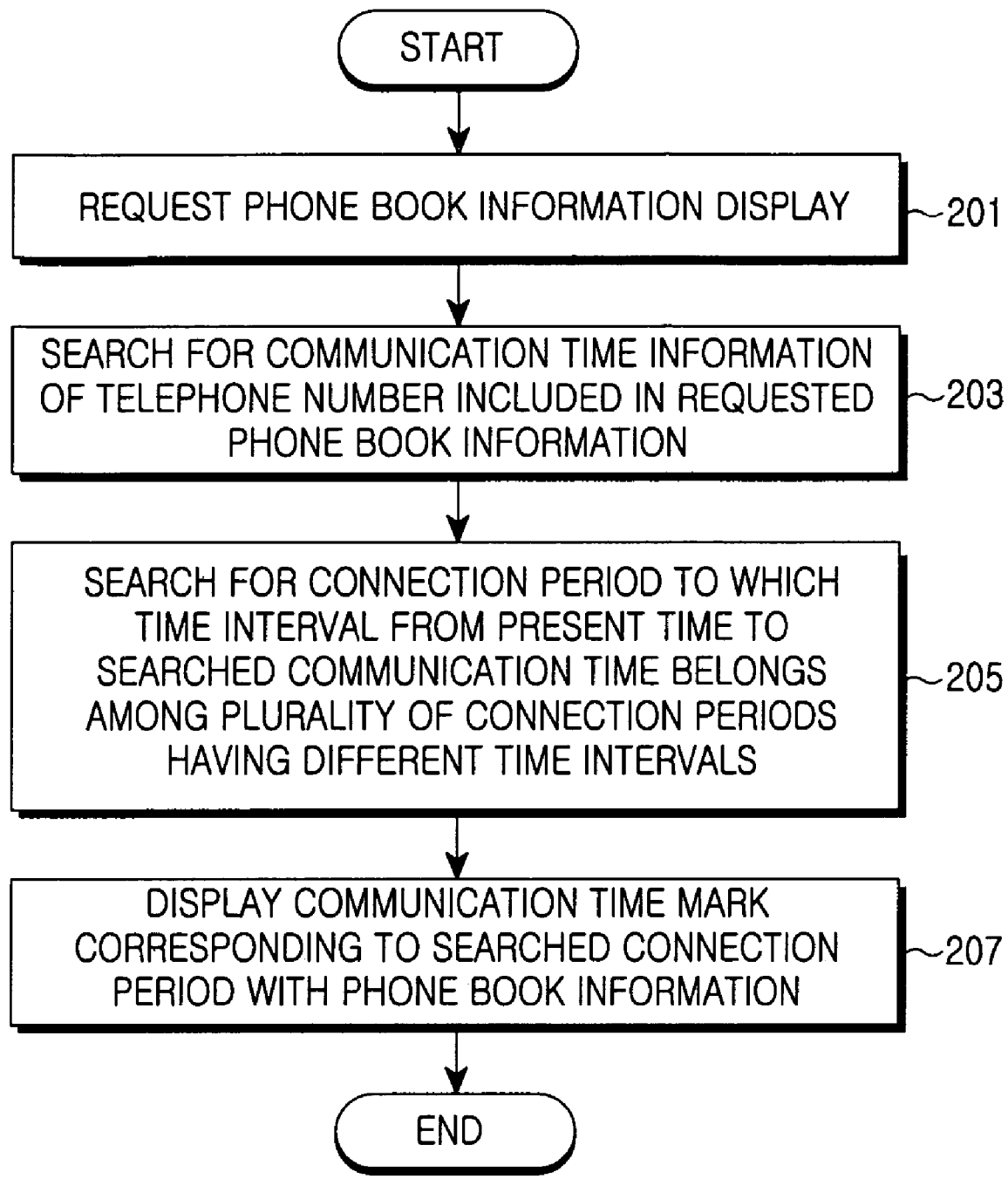
FIG. 3 is a flowchart illustrating a phone book information display process according to a preferred embodiment of the present invention.

Referring to FIG. 3, in step 201, the controller module 20 receives a phone book information display request from a user. The phone book information display request can be a display request of a telephone number stored at a specific address or a display request of a plurality of telephone numbers registered as a specific user name. In step 203, the controller module 20 searches for communication time information of a telephone number included in the requested phone book information. In step 205, the controller module 20 searches for a connection period to which a time interval from a present time to the searched communication time belongs among a plurality of connection periods having different predetermined time intervals. In step 207, the controller module 20 displays a mark corresponding to the searched connection period with the requested phone book information and finishes the process.

For example, a case where the phone book information requested by the user is a telephone number registered at a specific address will now be described with reference to FIG. 3. Herein, the connection period data and the mark data stored in the communication time information storage unit 31 is the same as illustrated in FIG. 2. By a display request of a telephone number registered at a specific address in step 201, in step 203, the controller module 20 searches for communication time information corresponding to the telephone number. In step 205, the controller module 20 calculates a time interval from a present time to the searched communication time. The controller module 20 determines whether the time interval calculated in step 205 belongs to a particular connection period among the plurality of pre-set connection periods, i.e., the first connection period having a time interval of a week, the second connection period having a time interval of a month, the third connection period having a time interval of two months, and the fourth connection period having a time interval of six months or more. In step 207, the controller module 20 selects a communication time mark corresponding to the time period to which the calculated time interval belongs and displays the selected communication time mark with the telephone number. If the calculated time interval is 5 days, the calculated time interval belongs to the first connection period, and the communication time mark is a green rectangle corresponding to the first connection period. Thus, in step 207, the controller module 20 displays the telephone number, a type of communication service using the telephone number, and the green rectangle.

The phone book information requested by the user can be a plurality of telephone numbers. In this case, the controller module 20 displays the plurality of telephone numbers, the types of communication services using the telephone numbers, and communication time information corresponding to the types of communication services. The controller module 20 can display representative communication time marks when a list of users registered in the phone book is provided according to a preferred embodiment of the present invention. The representative communication time mark is a communication time mark of a telephone number with which a most recent communication has been performed among one or more telephone numbers related to a user registered in the phone book.

Figure 4:
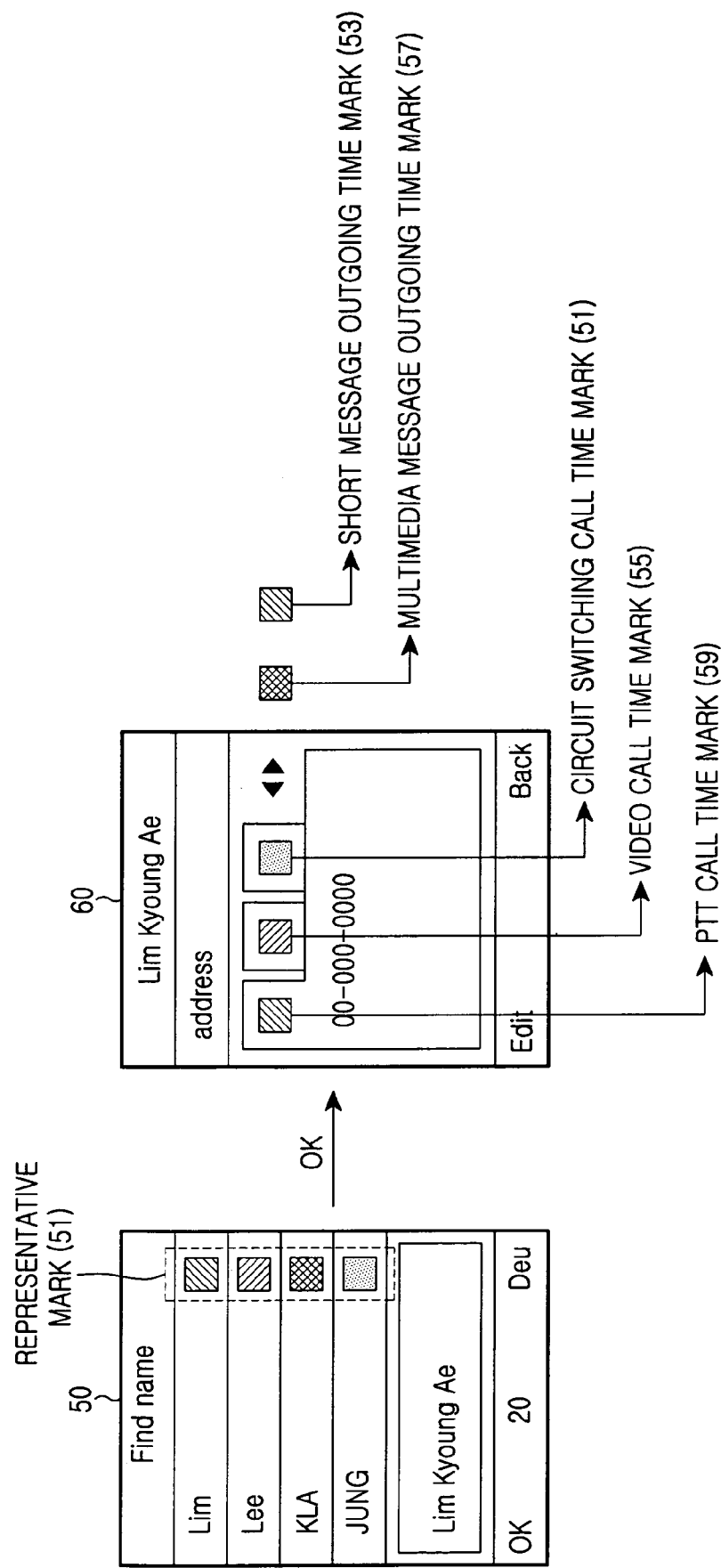
FIG. 4 is an illustration for explaining phone book information displayed on a display unit according to a preferred embodiment of the present invention.

A display screen of displaying a list of a plurality of users registered in the phone book and a display screen of displaying a plurality of telephone numbers registered in the phone book according to a preferred embodiment of the present invention will now be described with reference to FIG. 4, which is an illustration for explaining phone book information displayed on a display unit. Each of the communication time marks illustrated in FIG. 4 are formed with a rectangular having a different color according to a preferred embodiment of the present invention, although any set of marks can be used. A first screen 50 is a screen on which a list of a plurality of users searched according to a phone book search condition is displayed. On the first screen 50, representative communication time marks 51 are displayed with a list of user names. If a specific user is selected from the displayed user list, the controller module 20 displays telephone number information related to the selected user as shown in a second screen 60. Herein, the controller module 20 displays communication time marks 51, 53, 55, 57, and 59 of telephone numbers with the respective types of communication services used by the telephone numbers according to a preferred embodiment of the present invention.

By seeing the phone book information displayed as the display screens, the user can make a phone call to a person with whom the user has not recently kept in touch, and efficiently manage a user database with respect to deletion of a telephone number which has not been used for a long time. In addition, the user can identify telephone numbers used a long time ago or when communication using a specific telephone number was performed.

It is clear that the communication time marks can be set to be specific characters, such as animals, plants, etc., having different countenances and shapes. For example, if the specific characters are represented by one of the signs of the zodiac, graphic data of characters symbolizing different shapes of a constellation corresponding to the connection periods is stored as the communication time mark data. The signs of the zodiac can be set to correspond to birthdays of users registered in the phone book. Then, when phone book information is displayed, a sign of the zodiac corresponding to a birthday of a user is displayed with a shape corresponding to its connection period.

As described above, according to embodiments of the present invention, by providing graphic communication time information of communication services when phone book information is provided, a user can conveniently and efficiently manage a user database. In addition, the user can easily confirm a call history of a telephone number used a long time ago and a call history of a specific telephone number.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of managing a user database in a mobile terminal, the method comprising the steps of:
 when communication using a telephone number registered in a phone book occurs, updating a communication time of the telephone number to the time when the communication is terminated;
 searching for the communication time by a display request of phone book information including the telephone number;
 calculating a time interval from a present time to the communication time and searching for a connection period to which the calculated time interval belongs among a plurality of connection periods having different predetermined time intervals; and
 displaying a communication time mark corresponding to the searched connection period among a plurality of communication time marks corresponding to the plurality of connection periods with the requested phone book information.

2. The method of claim 1, wherein the number of the plurality of connection periods and a time interval of each connection period is set by a user.

3. The method of claim 1, wherein the plurality of communication time marks are formed with a figure having different colors.

4. The method of claim 1, wherein the plurality of communication time marks are one of animal characters, plant characters, and constellation characters such as the signs of the zodiac corresponding to birth years or months, each having different countenances and shapes.

5. The method of claim 1, further comprising the step of:
 if communication using the telephone number occurs again, updating communication time information of the telephone number to the time when the communication is terminated.

6. A method of managing a user database in a mobile terminal, the method comprising the steps of:
 when communication using a telephone number registered in a phone book occurs, updating a communication time of the telephone number to the time when the communication is terminated by identifying a type of communication service;
 searching for communication time information related to the telephone number by a display request of phone book information including the telephone number and detecting a communication termination time;
 calculating a time interval from a present time to the communication termination time and searching for a connection period to which the calculated time interval belongs among a plurality of connection periods having different predetermined time intervals; and
 displaying a communication time mark corresponding to the searched connection period among a plurality of communication time marks corresponding to the plurality of connection periods and a type of communication service related to the communication termination time with the requested phone book information.

7. The method of claims 6, wherein if the type of communication service is a message service, the communication time information is updated by changing the communication termination time to a message outgoing time.

8. The method of claim 6, wherein if a list of a plurality of users is included in the phone book information, when the phone book information is displayed, a communication time mark of a telephone number with which a most recent communication has been performed among one or more telephone numbers related to each user is displayed with the user list.

9. An apparatus for managing a user database in a mobile terminal, the apparatus comprising:

a phone book;

a memory module for storing communication time information corresponding to telephone numbers registered in the phone book, a plurality of connection periods having different time intervals, and a plurality of communication time marks corresponding to the plurality of connection periods by identifying types of communication services; and a controller module for, when communication using an arbitrary telephone number registered in a phone book occurs, updating a communication time of the telephone number to the time when the communication is terminated; searching for the communication time by a display request of phone book information including the telephone number, calculating a time interval from a present time to the communication time and searching for a connection period to which the calculated time interval belongs, and displaying a communication time mark corresponding to the searched connection period with the requested phone book information.

\* \* \* \* \*